(12) United States Patent
Gebhart et al.

(10) Patent No.: US 8,458,693 B2
(45) Date of Patent: Jun. 4, 2013

(54) TRANSITIONING FROM STATIC TO DYNAMIC CLUSTER MANAGEMENT

(75) Inventors: Alexander Gebhart, Akazienweg (DE); Erol Bozak, Vinzentiusstrasse (DE)

(73) Assignee: SAP AG, Walldorf (DE)

( * ) Notice: Subject to any disclaimer, the term of this patent is extended or adjusted under 35 U.S.C. 154(b) by 1683 days.

(21) Appl. No.: 11/833,149

(22) Filed: Aug. 2, 2007

(65) Prior Publication Data

US 2009/0037902 A1    Feb. 5, 2009

(51) Int. Cl.
*G06F 9/445*    (2006.01)
*G06F 9/44*    (2006.01)
*G06F 15/177*    (2006.01)
*G06F 15/173*    (2006.01)

(52) U.S. Cl.
USPC ........... 717/176; 717/171; 709/221; 709/225; 709/226

(58) Field of Classification Search
None
See application file for complete search history.

(56) References Cited

U.S. PATENT DOCUMENTS

| | | | |
|---|---|---|---|
| 6,067,545 A * | 5/2000 | Wolff | 1/1 |
| 6,173,420 B1 * | 1/2001 | Sunkara et al. | 714/38.14 |
| 6,243,744 B1 * | 6/2001 | Snaman et al. | 709/220 |
| 6,453,468 B1 * | 9/2002 | D'Souza | 717/168 |
| 6,625,648 B1 * | 9/2003 | Schwaller et al. | 709/224 |
| 6,763,380 B1 * | 7/2004 | Mayton et al. | 709/224 |
| 6,834,301 B1 * | 12/2004 | Hanchett | 709/223 |
| 7,010,782 B2 * | 3/2006 | Narayan et al. | 717/124 |
| 7,035,858 B2 * | 4/2006 | Dinker et al. | 1/1 |
| 7,130,897 B2 * | 10/2006 | Dervin et al. | 709/221 |
| 7,139,925 B2 * | 11/2006 | Dinker et al. | 714/4.3 |
| 7,155,715 B1 * | 12/2006 | Cui et al. | 717/177 |
| 7,178,144 B2 * | 2/2007 | Melchione et al. | 717/172 |
| 7,203,700 B1 * | 4/2007 | Kumar et al. | 1/1 |
| 7,293,255 B2 * | 11/2007 | Kumar | 717/109 |
| 7,343,601 B2 * | 3/2008 | Azagury et al. | 717/176 |
| 7,370,092 B2 * | 5/2008 | Aderton et al. | 709/220 |
| 7,392,421 B1 * | 6/2008 | Bloomstein et al. | 714/4.4 |
| 7,398,471 B1 * | 7/2008 | Rambacher et al. | 715/744 |
| 7,440,996 B2 * | 10/2008 | Gebhart | 709/203 |
| 7,464,376 B2 * | 12/2008 | Bozak et al. | 717/174 |
| 7,483,968 B1 * | 1/2009 | Rambacher et al. | 709/223 |
| 7,490,323 B2 * | 2/2009 | D'Alo et al. | 717/178 |

(Continued)

OTHER PUBLICATIONS

Vogels et al., An Overview of the Galaxy Management Framework fro Scalable Enterprise Cluster Computing, published Dec. 2000, pp. 1-10.*

(Continued)

*Primary Examiner* — Tuan Q Dam
*Assistant Examiner* — Zheng Wei
(74) *Attorney, Agent, or Firm* — Mintz, Levin, Cohn, Ferris, Glovsky & Popeo, P.C.

(57) ABSTRACT

Methods and apparatus, including computer program products, are provided for transitioning components of a static cluster system to a dynamic cluster system. In one aspect, there is provided a computer-implemented method. The method may include selecting, at a user interface, a static cluster system to transition one or more components of the selected static cluster system to a dynamic cluster system. At least one install agent may be provided to the selected static cluster system. The install agent may be configured to install one or more agents outside of the selected static cluster system. The one or more agents may be configured to move the one or more components from the selected static cluster system to a dynamic cluster system. Related apparatus, systems, methods, and articles are also described.

20 Claims, 4 Drawing Sheets

U.S. PATENT DOCUMENTS

| | | | | |
|---|---|---|---|---|
| 7,533,168 B1* | 5/2009 | Pabla et al. | | 709/224 |
| 7,571,227 B1* | 8/2009 | Pabla | | 709/224 |
| 7,574,707 B2* | 8/2009 | Bozak et al. | | 717/176 |
| 7,594,015 B2* | 9/2009 | Bozak et al. | | 709/226 |
| 7,627,655 B2* | 12/2009 | Bozak et al. | | 709/220 |
| 7,653,902 B2* | 1/2010 | Bozak et al. | | 717/177 |
| 7,673,054 B2* | 3/2010 | Bozak et al. | | 709/228 |
| 7,703,029 B2* | 4/2010 | Bozak et al. | | 715/764 |
| 7,769,864 B2* | 8/2010 | Gebhart et al. | | 709/226 |
| 7,770,168 B1* | 8/2010 | Howarth et al. | | 717/178 |
| 7,779,063 B2* | 8/2010 | Gebhart et al. | | 709/201 |
| 7,801,944 B2* | 9/2010 | Shuster | | 709/203 |
| 7,810,090 B2* | 10/2010 | Gebhart | | 717/176 |
| 7,831,820 B2* | 11/2010 | Winner et al. | | 713/1 |
| 7,872,998 B2* | 1/2011 | Ono et al. | | 370/328 |
| 7,882,210 B2* | 2/2011 | Bozak et al. | | 709/223 |
| 8,041,798 B1* | 10/2011 | Pabla et al. | | 709/223 |
| 2002/0049859 A1* | 4/2002 | Bruckert et al. | | 709/246 |
| 2002/0159479 A1* | 10/2002 | Watanuki et al. | | 370/466 |
| 2002/0188708 A1* | 12/2002 | Takahashi et al. | | 709/223 |
| 2003/0009533 A1* | 1/2003 | Shuster | | 709/217 |
| 2003/0158915 A1* | 8/2003 | Gebhart | | 709/219 |
| 2003/0204509 A1* | 10/2003 | Dinker et al. | | 707/100 |
| 2003/0204786 A1* | 10/2003 | Dinker et al. | | 714/43 |
| 2004/0088412 A1* | 5/2004 | John et al. | | 709/226 |
| 2004/0210895 A1* | 10/2004 | Esfahany | | 717/174 |
| 2005/0027843 A1* | 2/2005 | Bozak et al. | | 709/223 |
| 2005/0138156 A1* | 6/2005 | Gebhart et al. | | 709/223 |
| 2005/0138618 A1* | 6/2005 | Gebhart | | 717/176 |
| 2005/0198275 A1* | 9/2005 | D'Alo et al. | | 709/224 |
| 2005/0289388 A1* | 12/2005 | Black-Ziegelbein et al. | | 714/7 |
| 2006/0037016 A1* | 2/2006 | Saha et al. | | 717/178 |
| 2006/0130055 A1* | 6/2006 | Bozak et al. | | 717/174 |
| 2006/0195561 A1* | 8/2006 | Keane et al. | | 709/223 |
| 2006/0294516 A1* | 12/2006 | Winner et al. | | 718/1 |
| 2007/0036115 A1* | 2/2007 | Ono et al. | | 370/338 |
| 2007/0047466 A1* | 3/2007 | Todokoro | | 370/254 |
| 2008/0005287 A1* | 1/2008 | Harvey et al. | | 709/220 |
| 2008/0010631 A1* | 1/2008 | Harvey et al. | | 717/131 |
| 2008/0281959 A1* | 11/2008 | Robertson | | 709/224 |
| 2009/0031012 A1* | 1/2009 | Johnson | | 709/222 |
| 2009/0037572 A1* | 2/2009 | Gebhart et al. | | 709/224 |
| 2009/0204702 A1* | 8/2009 | Jensen et al. | | 709/224 |
| 2009/0216828 A1* | 8/2009 | Gebhart et al. | | 709/201 |
| 2009/0228629 A1* | 9/2009 | Gebhart et al. | | 711/6 |
| 2009/0228883 A1* | 9/2009 | Gebhart et al. | | 718/1 |
| 2011/0055361 A1* | 3/2011 | Dehaan | | 709/221 |
| 2011/0276685 A1* | 11/2011 | de Waal et al. | | 709/224 |

OTHER PUBLICATIONS

HP CMP 3.1 Cluster Management Utility, Published by Hewlett-Packard Development Company, 2006, pp. 1-33.*

CMU: Cluster Management Utility, Installation guide Version 3.1, Sep. 2006, Published by HP, 2006, pp. 1-26.*

* cited by examiner

TRANSITIONING FROM STATIC TO DYNAMIC CLUSTER MANAGEMENT

FIELD

The present disclosure generally relates to distributed computing systems. More particularly, the present disclosure relates to transitioning from a static cluster of computers to a dynamic cluster of computers.

BACKGROUND

Computers have now become an integral part of our society both in business and in residential settings. Almost every business of sufficient size in Germany, the United States, and other developed countries have one or more computers to assist them in running their businesses. Similarly, many families in those countries now have computers at home that are used to run various applications including games.

Some attribute the popularity of the computers to the Internet. The Internet provides people with a ready access to vast amounts of data. Many people now get their news, sports, stock, entertainment, and other information primarily from the Internet. But businesses have also embraced the Internet. The Internet provides the opportunity for computers to communicate instantly with other computers or individuals. Business processes that were once restricted to intranets and their users are now moving to the Internet. Accordingly, companies are moving more and more of their data to electronic forms. In addition, companies have amassed huge amounts of data in an effort to understand their business, improve performance, and build stronger employee, customer, and partner relationships.

Today, distributed computing systems are widely used by various organizations to accommodate the ever-increasing demand for the computer resources from consumers and businesses alike. In a distributed computing system, nodes (e.g., computers, processors, servers, etc.) are grouped or clustered to perform certain functions. Generally, a cluster is a collection of computer nodes that work together to perform a function, so that in many respects the cluster can be viewed as a single computer. The nodes of a cluster are usually coupled by a network, such as the Internet or an intranet. The cluster may be managed either statically or dynamically.

A static cluster is a group of application servers that participate in some form of workload management. With a static cluster, the application servers that are in a cluster are static, and once defined, all the application servers in the cluster are usually started or stopped all at once. In short, the application servers are statically assigned to a specific cluster.

In contrast, dynamic clusters are controlled by autonomic controllers (or managers) that optimize the performance of the cluster. Moreover, a dynamic cluster can start and stop individual instances of application servers as required. A dynamic cluster may also dynamically balance the workloads of the nodes of the cluster based on performance information collected from cluster nodes. As a consequence, dynamic clusters optimize the use of the processing capabilities of the computer in the clusters. When compared to a single computer or even a static cluster, the dynamic cluster may provide increased performance and overall lower total cost of ownership by better utilizing the existing processing capabilities of the cluster. However, even though there are many advantages to dynamic clusters, many have not transitioned from the more prevalent static cluster management to dynamic cluster management.

One example of a dynamic computing system environment is provided by SAP, AG's NetWeaver Adaptive Computing infrastructure. The Adaptive Computing infrastructure enables the dynamic assignment of hardware resources to serve specific application services. In this way, SAP NetWeaver enables an Adaptive Computing infrastructure to provide business solutions based on SAP NetWeaver running at peak efficiency. In most cases, SAP's Adaptive Computing provides lower total cost of ownership by providing better server utilization, higher service levels, and standardized building blocks for the infrastructure.

SUMMARY

The subject matter disclosed herein provides methods and apparatus, including computer program products, for transitioning from a static cluster system to a dynamic cluster system.

In one aspect, there is provided a computer-implemented method. The method may include selecting, at a user interface, a static cluster to transition one or more components of the selected static cluster to a dynamic cluster. At least one install agent may be provided to the selected static cluster. For example, the install agent may be implemented within the selected static cluster. The install agent within the cluster may be configured to install one or more agents outside of the selected static cluster. The one or more agents installed outside of the selected static cluster may be configured to move the one or more components from the selected static cluster to a dynamic cluster.

Variations may include one or more of the following features. The user interface may be used to select the static cluster from a list of a plurality of static clusters. The install agent installed within the static cluster may itself be installed using a so-called "hot deployment" feature provided by the static cluster, or the install agent may be installed as an upgrade or a patch. The agent installed outside of the selected static cluster may move the one or more components of the selected static cluster to the dynamic cluster. The agent may also initiate a shutdown of the selected static cluster, when the agent moves the one or more components. The agent may also initiate a start of the dynamic cluster. The agent may also be configured to include a first location of the one or more components at the selected cluster and a second location of a central storage location at the dynamic cluster. The one or more agents installed outside of the selected static cluster may be installed outside of the static cluster by installing the one or more agents in a processor not being moved.

The subject matter described herein may be implemented to realize the advantage of facilitating a transition from a static cluster to a dynamic cluster.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1:
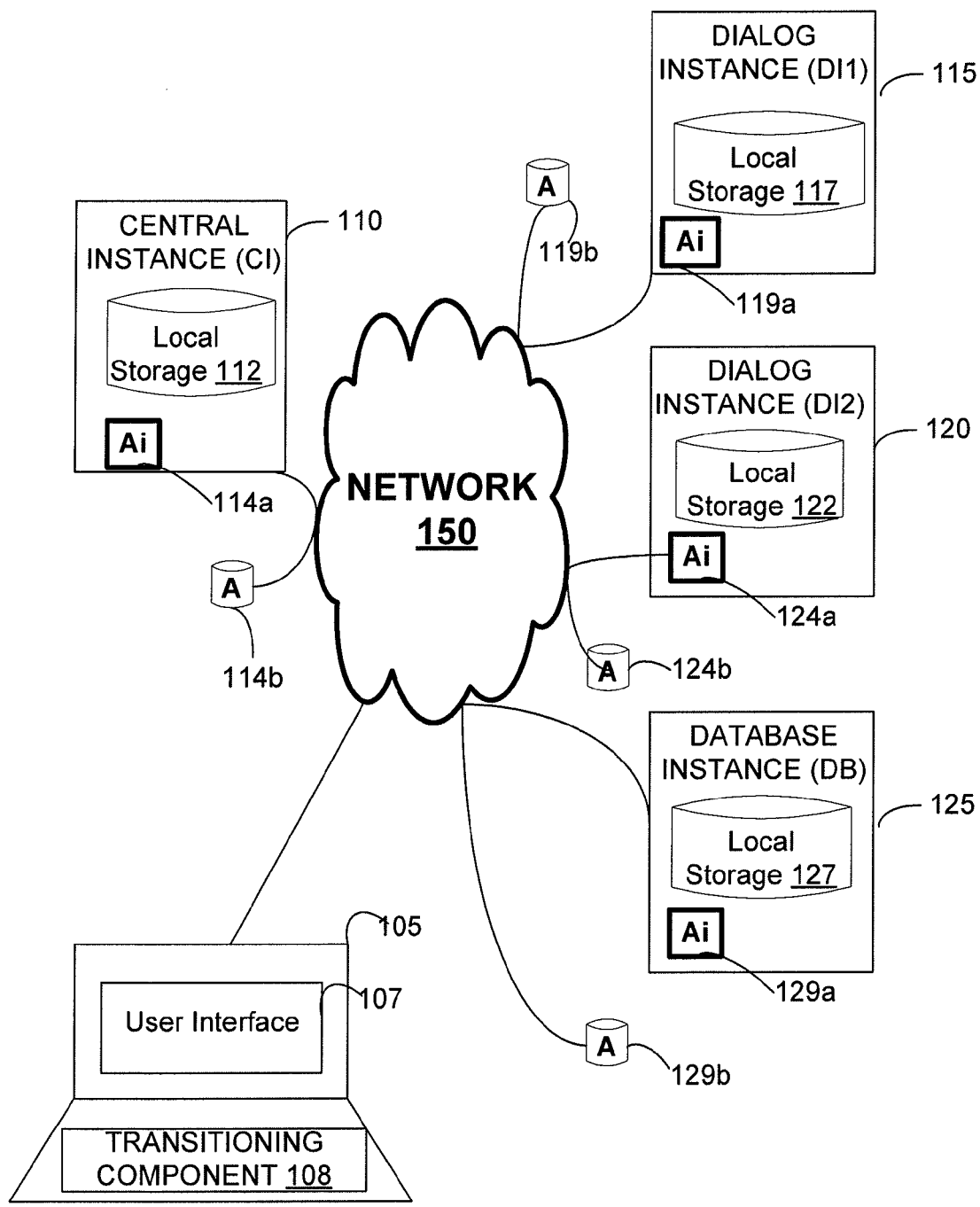
FIG. 1 depicts a block diagram of a static cluster system.

Like labels are used to refer to same or similar items in the drawings.

DETAILED DESCRIPTION

FIG. 1 depicts a static cluster 100 that is statically managed (e.g., with a static cluster management system, which may be implemented as part of a central instance 110). As noted above, a cluster is a collection of computer nodes (e.g., processors, computers, servers, etc.) that work together. The static cluster 100 also includes a computer 105 including a user interface 107 for accessing a transitioning component 108 for transitioning from the static cluster 100 (FIG. 1) to a dynamic cluster (described below with respect to FIG. 3). The transitioning component 108 provides each cluster and/or cluster node with an install agent (Ai) residing inside of the cluster, which installs one or more agents (A) outside of the cluster and/or cluster node. The agent (A) automatically moves components of the static cluster 100 to the dynamic cluster of FIG. 3.

The install agent (Ai) and agent (A) may be implemented as a program, group of programs, and/or small binary object (e.g., an applet) that performs one or more functions associated with transitioning from a static cluster system to a dynamic cluster system, as described further below. One or more of the install agents (e.g., Ai 114a, 119a, 124a, and 129a) are used to install one or more of the so-called "external" agents (e.g., agents 114b, 119b, 124b, and 129b). The install agent Ai may be deployed by using, for example, a hot deployment feature of the cluster (or system). When this is the case, install agent Ai may be adapted to the cluster environment. For example, if an ABAP cluster is used, install agent Ai may be adapted to the cluster environment by being compatible with ABAP (e.g., written in ABAP, available from SAP, AG). In the case of a J2EE cluster, the install agent may be compatible with Java (e.g., a servlet, an Enterprise Java Bean, and the like), while a .NET cluster may use an install agent Ai written in C#, and the like. In any case, install agent Ai runs (e.g., executes) inside of the cluster being transitioned, so in some implementations, the install agent Ai may not be implemented as a so-called "standalone program" or applet. On the other hand, agent A residing outside of the cluster (e.g., in a processor, computer, or cluster) not being transitioned from static to dynamic) may, in some cases, be implemented as a standalone program (e.g., an .exe program or a J2SE (Java 2 Platform, Standard Edition) based application).

The cluster 100 includes one or more cluster nodes (i.e., portions of a cluster), such as a central instance 110 statically configured on the cluster and dialog instances 115-120. The central instance 110 is an application server that controls the processes among (and within) nodes of a cluster and may include a message server for communications. The dialog instances 115 and 120 are also application servers configured on the cluster 100. For example, the dialog instance may be an application server providing applications, such as a customer relationship management (CRM) application, an enterprise resource planning (ERP) application, a product lifecycle management application, a supply chain management (SCM) application, a supplier relationship management application, as well as any other application. When a client computer accesses an SCM application at the central instance, it is dispatched to any of the dialog instances and from then on, an instance of the SCM application runs on the physical machine on which the dialog instance runs. If another client computer accesses the central instance, the SCM application may be served from a different dialog instance or from the same dialog instance. In this example, the dialog instance 115 operates as an application server that wraps each instance of the SCM application, so that the two SCM applications can run independently regardless of whether they run on the same or different nodes within the cluster.

System 100 also depicts an instance of a database application server that belongs to cluster 100.

The portions of cluster 100 (e.g., central instance 110, dialog instances 115-120, and database 125) may each include local storage 112, 117, 122, and 127 for storing applications, such as the applications served to a client computer (e.g., computer 105 and the like) by the cluster.

Figure 2:
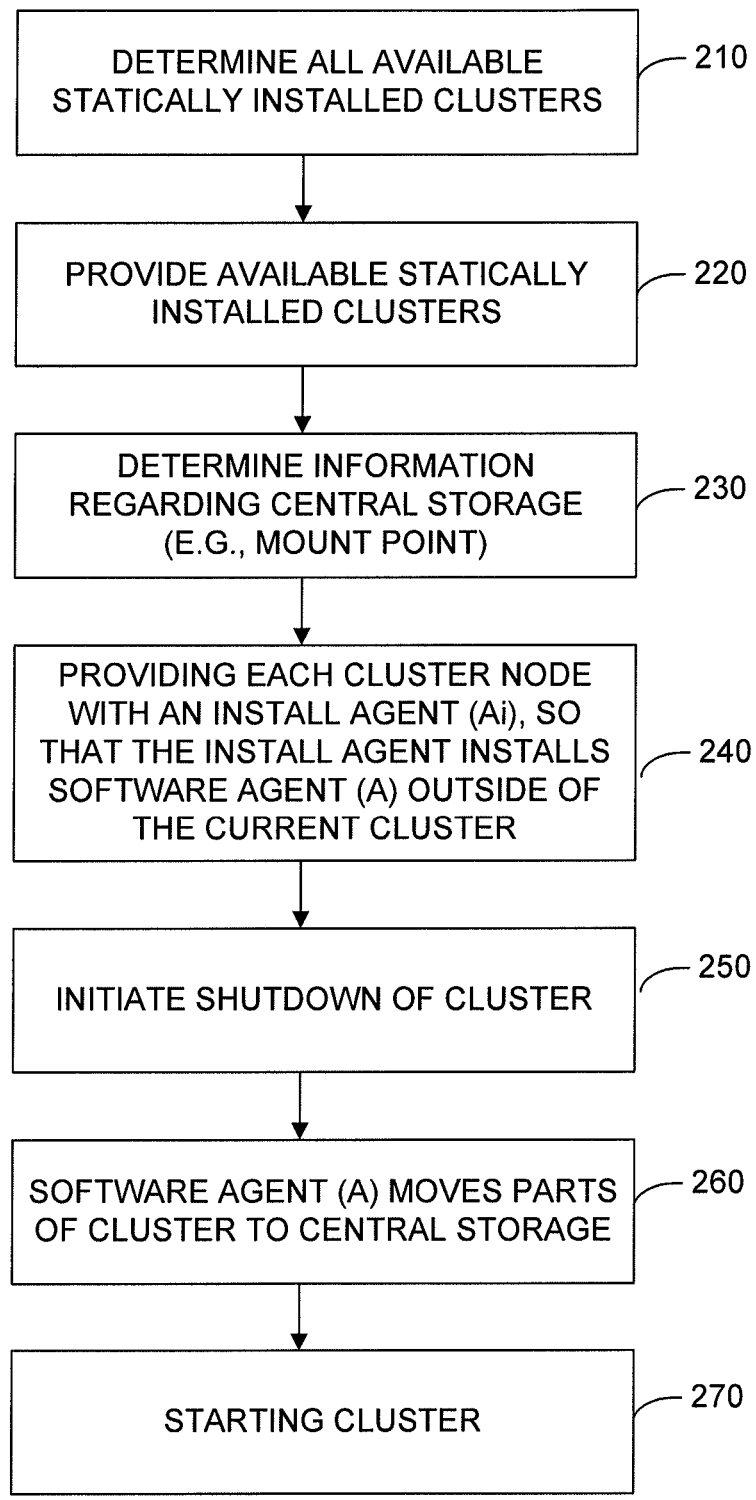
FIG. 2 depicts a process flowchart for transitioning from a static cluster system to a dynamic cluster system.

FIG. 2 depicts a process for transitioning from a static cluster system to a dynamic cluster system. At 210, the transitioning component 108 may determine all available static clusters. To determine all available statically installed clusters, the transitioning component 108 may gather information from a registry of the clusters. One such registry is the System Landscape Directory (SLD) available from SAP, AG, Walldorf, Germany.

At 220, the transitioning component 108 may provide the determined statically installed clusters to user interface 107 for presentation to a user of computer 105. Moreover, the transitioning module 108 may also provide information describing the clusters, such as a cluster name, a system identifier, and a location (e.g., an Internet Protocol (IP) address and Media Access Control (MAC) address). In some implementations, the user interface 107 presents (e.g., shows) the statically installed clusters and information describing the clusters. Moreover, user interface 107 may be used to select which clusters will be transitioned from a static cluster system to dynamic cluster system.

At 230, transitioning component 108 may determine the central storage point for the dynamic cluster installation. The central storage point may be implemented as a network attached storage (NAS), as described below with respect to 310 at FIG. 3, although any other storage mechanism may be used instead including a storage area network (SAN). To determine the central storage point for the dynamic cluster system, in some implementations, a user of user interface 107 may provide information identifying the central storage point (e.g., a NAS or a SAN); while in other implementations, the transitioning component 108 determines the central storage programmatically by trying to connect to a storage mechanism (e.g., transitioning component 108 may attempt to connect to one or more storage mechanisms, and if a connect fails, no central storage point is present).

At 240, the transitioning component 108 provides each cluster node with an install agent (labeled Ai on FIG. 1). The install agents 114a, 119a, 124a, and 129a may be provided to each cluster node (i.e., a part or portion of the cluster) using a so-called "hot deployment" function included within commercially available cluster systems. After the install agents 114a, 119a, 124a, and 129a are provided to each cluster 110, 115, 120, 125, each install agent 114a, 119a, 124a, and 129a is started within the cluster. The install agents 114a, 119a, 124a, and 129a each start a software agent 114b, 119b, 124b, and 129b outside of the cluster. For example, a copy of agent 114b may be copied via network 150 to a local storage device (e.g., hard drive) on a computer not on the cluster and/or a cluster node (e.g., not depending on the cluster being transitioned to a dynamic cluster). Alternatively, agent Ai may be deployed as a patch or an upgrade to the cluster system 100. With this patch or upgrade, the cluster itself could provide the same functionality agent Ai provides, so that the functionality to install software outside of the cluster would always be available. As such, the cluster manager (e.g., central instance 110) may handle any deployments inside as well as outside of a cluster and/or cluster nodes.

Once installed and running on a computer outside the cluster, at 250 the agents 114b, 119b, 124b, and 129b may begin shutting down their respective clusters. Since agents 114b, 119b, 124b, and 129b are started by the cluster 100, the agents 114b, 119b, 124b, and 129b know where the central instance 110 is, and, as such, each of the agents 114b, 119b, 124b, and 129b may send a shutdown command via network 150 to central instance 110 to shutdown the cluster. The central instance 110 then initiates the shutdown of the whole cluster 100.

At 260, each agent 114b, 119b, 124b, and 129b moves the components of the cluster to the network attached storage used for the dynamic cluster system. For example, if cluster 120 is an application server for a CRM application, the software for that application may be moved from local storage 122 to network attached storage 310 (FIG. 3) of dynamic cluster system 300. In some implementations, each agent 114b, 119b, 124b, and 129b includes a predefined script identifying what components to move to the network attached server 310.

In some cases, some of the software components for a cluster may not be moved to the network attached server 310. For example, software components needed locally to start the cluster 110 from the local machine may remain at cluster 110. For example, a file system hierarchy may be retained at cluster 110.

Figure 3:
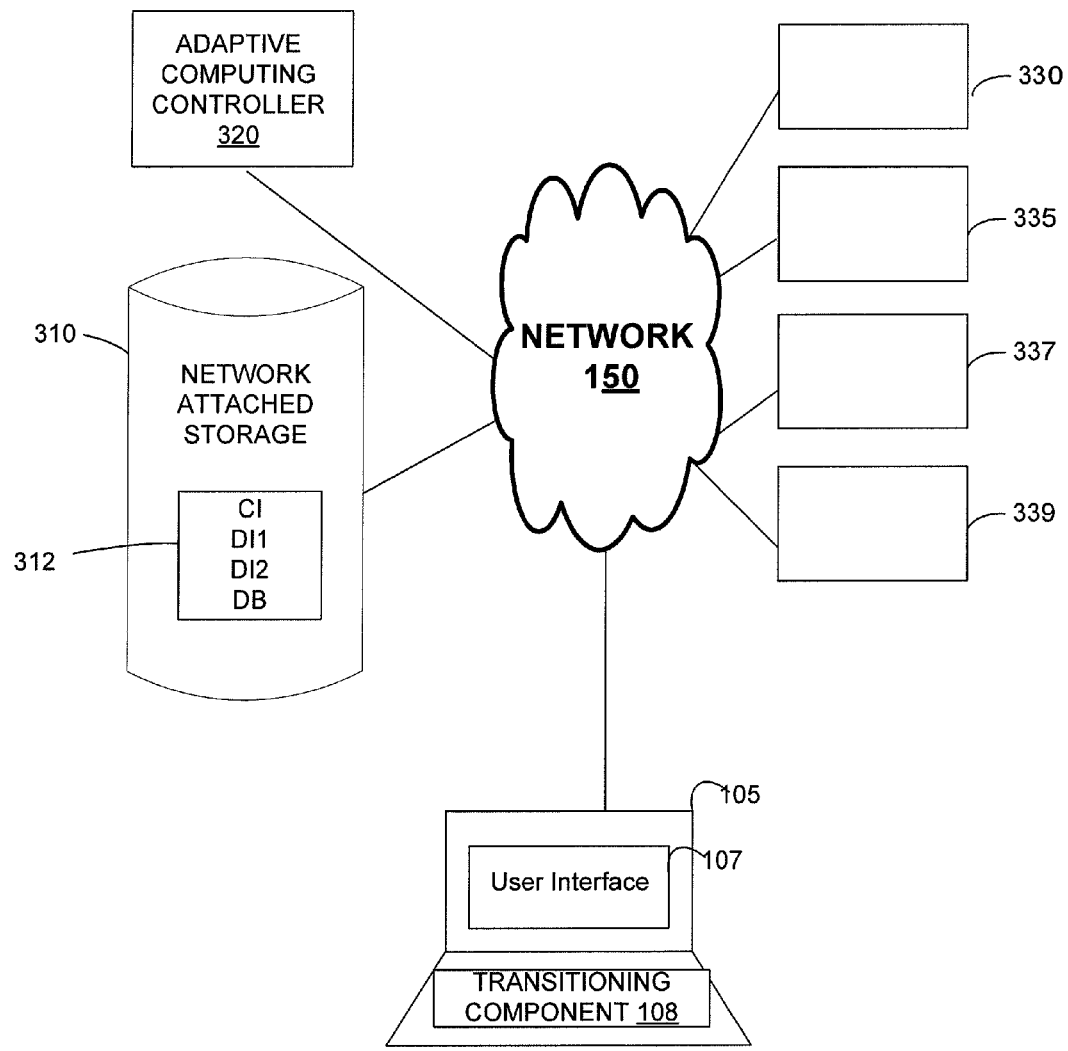
FIG. 3 depicts a block diagram of a dynamic cluster system.

FIG. 3 depicts a dynamic cluster system 300 managed dynamically. The dynamic cluster management system 300 includes a network attached server 310, a controller 320 (e.g., a central instance, or SAP's Adaptive Computing Controller), and cluster nodes 330-339.

The controller 320 enables the addition and removal of computing resources with minimal administrative effort. The controller 320 may also manage workloads and assign instances of applications to a computing resource, such as one or more nodes. The controller 320 may also build connections between computing and storage resources, provide a transport layer for virtualization, and support different network topologies, such as TCP/IP, iSCSI, and Fibre Channel. The controller 320 may be coupled to or include a registry, such as SAP's SLD, with information representative of the current and past state of the clusters.

Returning to FIG. 2 at 260, when each agent 114b, 119b, 124b, and 129b moves the components of the cluster (also referred to as a cluster node) to the network attached storage 310, the components are loaded as depicted at 312.

Figure 4:
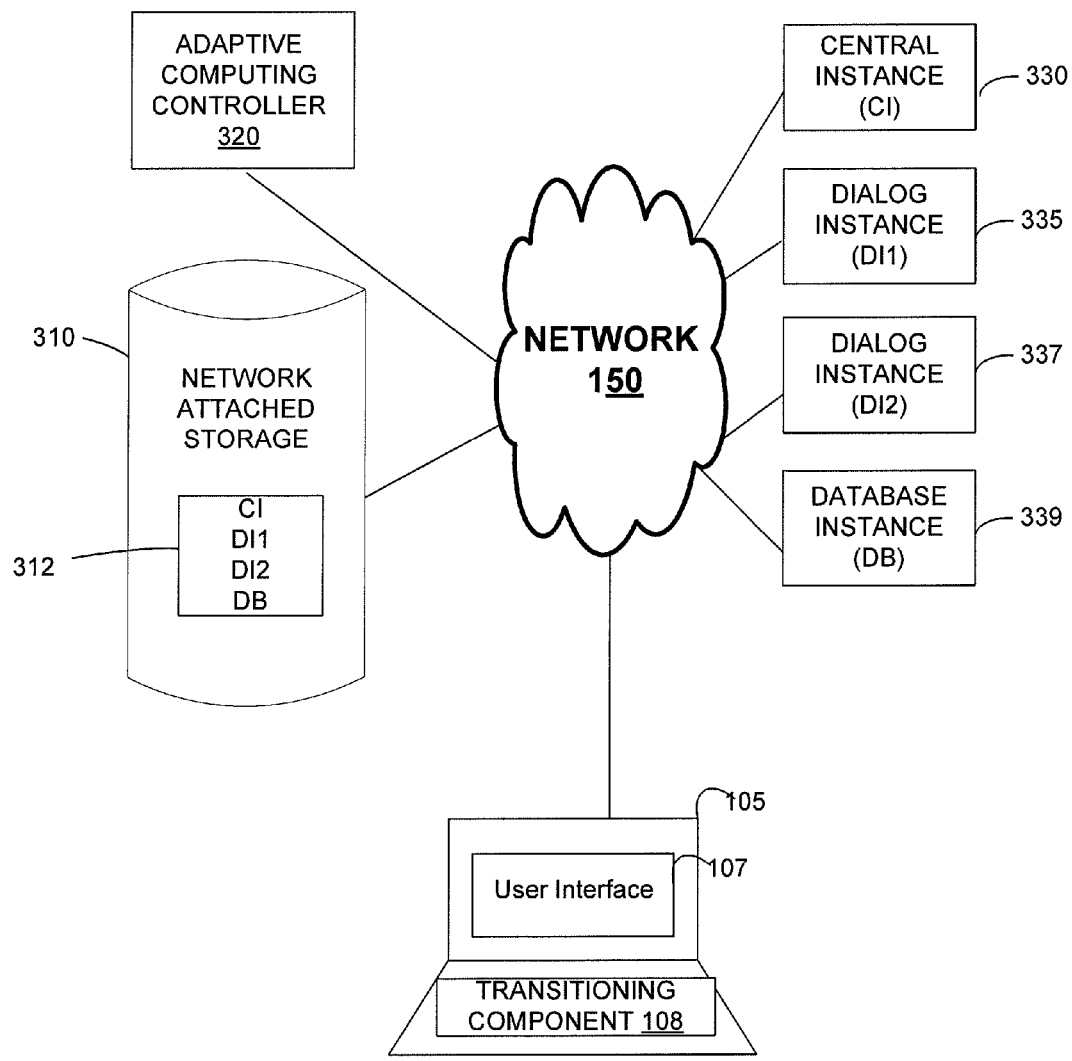
FIG. 4 depicts the system of FIG. 3 after the cluster components have been restarted in the dynamic cluster system.

At 270, each agent 114b, 119b, 124b, and 129b is able to start the corresponding cluster nodes (e.g. nodes C1, DI1, DI2 and DB) usually based on a notification from controller 320. Alternatively, a user of user interface 107 may be notified by each agent that the move is complete, so that the user can use the user interface 107 to initiate the start of one or more of the clusters or cluster nodes. In some implementations, each agent 114b, 119b, 124b, and 129b may notify a registry of which components have been moved and that the move is complete before initiating the start of the cluster. FIG. 4 depicts FIG. 3 after each cluster has been started 330-339.

In some implementations, the agents 114b, 119b, 124b, and 129b remain on their computers to ensure that when a cluster is started, it is done by linking the network attached storage 310 to the corresponding machine and starting different portions of a cluster afterwards, e.g., via controller 320. For example, if the network attached storage is not linked to any physical machine at all times (e.g., at system startup), the agent (e.g., agents 114b, 119b, 124b, and 129b) does the linking to the network attached storage by executing a bind command (to invoke the network layer at the physical machine) and mount commands afterwards to link the file system(s) of the network attached storage.

Referring again to FIG. 1, the computer 105 may include a user interface 107 for interacting with transitioning component 108. Although transitioning component 108 is depicted at computer 105, transitioning component 108 may be located anywhere and in multiple locations. In some implementations, transitioning component 108 is implemented as a service, such as a Web service or program, at a server or Web site. A service is a software component that is capable of being accessed via standard network protocols, such as Simple Object Access Protocol (SOAP) over Hyper Text Transfer Protocol (HTTP). In other implementations, transitioning component 108 is part of another program, such as a user interface or a cluster management system.

The user interface 107 may be implemented as any interface that enables a user to interact with an application or program, such as transitioning component 108. The user interface 107 may be implemented as a browser, such as Netscape Navigator or the like, or any other type of graphical user interface. In some cases, SAP Web Dynpro (commercially available from SAP AG, Walldorf, Germany) may be used as a model-based development environment for generating user interface 107, although other development environments may be used.

Network 150 may be any type of communications mechanism and may include, alone or in any suitable combination, the Internet, a telephony-based network, a local area network (LAN), a wide area network (WAN), a dedicated intranet, wireless LAN, an intranet, a wireless network, a bus, or any other communication mechanisms. Further, any suitable combination of wired and/or wireless components and systems may provide network 150. Moreover, network 150 may be embodied using bi-directional, unidirectional, or dedicated networks. Communications through network 150 may also support standard transmission protocols, such as Transmission Control Protocol/Internet Protocol (TCP/IP), Hyper Text Transfer Protocol (HTTP), SOAP, RPC, or other protocols.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Moreover, although the subject matter described above was described with respect to cluster 100 and 300, the subject matter described herein may be used to transition any type of static cluster (and/or cluster nodes) to a dynamic cluster (and/or cluster nodes).

The foregoing description is intended to illustrate but not to limit the scope of the invention, which is defined by the scope of the appended claims. Other embodiments are within the scope of the following claims.

What is claimed is:

1. A computer-implemented method comprising:
    selecting a static cluster to transition one or more nodes of the selected static cluster to a dynamic cluster; and
    providing to each node of the selected static cluster at least one install agent within the selected static cluster, the at least one install agent configured to install one or more agents outside of the selected static cluster, the one or more installed agents configured to move the one or more nodes from the selected static cluster to the dynamic cluster.

2. The computer-implemented method of claim 1, wherein providing further comprises:
    providing the at least one install agent as a software upgrade or a patch to a management software of the static cluster.

3. The computer-implemented method of claim 1, wherein providing further comprises:
    installing the one or more agents outside of the selected static cluster by installing the one or more agents in a processor not being moved.

4. The computer-implemented method of claim 1 further comprising:
    selecting, at a user interface, the static cluster from a list of a plurality of static clusters.

5. The computer-implemented method of claim 1 further comprising:
    moving, by the one or more installed agents, the one or more nodes of the selected static cluster to the dynamic cluster.

6. The computer-implemented method of claim 5 further comprising:
    initiating, by the one or more installed agents, a shutdown of the selected static cluster, when the one or more agents move the one or more installed nodes, the one or more nodes including an application server and a central instance.

7. The computer-implemented method of claim 6 further comprising:
    initiating, by the one or more installed agents, a start of the dynamic cluster, wherein the one or more installed agents operate outside of the static cluster by operating on a processor not being transitioned.

8. The computer-implemented method of claim 1 further comprising:
    configuring the one or more installed agents to include a first location of the one or more nodes at the selected static cluster and a second location of a central storage location at the dynamic cluster.

9. A non-transitory computer-readable medium containing instructions to configure at least one processor to perform a method, the method comprising:
    selecting a static cluster to transition one or more nodes of the selected static cluster to a dynamic cluster; and
    providing to each node of the selected static cluster at least one install agent within the selected static cluster, the at least one install agent configured to install one or more agents outside of the selected static cluster, the one or more installed agents configured to move the one or more nodes from the selected static cluster to the dynamic cluster.

10. The non-transitory computer-readable medium of claim 9, wherein providing further comprises:
    providing the at least one install agent as a software upgrade or a patch to a management software of the static cluster.

11. The non-transitory computer-readable medium of claim 9, wherein providing further comprises:
    installing the one or more agents outside of the selected static cluster by installing the one or more agents in a processor not being moved.

12. The non-transitory computer-readable medium of claim 9 further comprising:
    selecting, at a user interface, the static cluster from a list of a plurality of static cluster.

13. The non-transitory computer-readable medium of claim 9 further comprising:
    moving, by the one or more installed agents, the one or more nodes of the selected static cluster to the dynamic cluster.

14. The non-transitory computer-readable medium of claim 13 further comprising:
    initiating, by the one or more installed agents, a shutdown of the selected static cluster, when the one or more agents move the one or more nodes.

15. The non-transitory computer-readable medium of claim 14 further comprising:
    initiating, by the one or more installed agents, a start of the dynamic cluster.

16. The non-transitory computer-readable medium method of claim 9 further comprising:
    configuring the one or more installed agents to include a first location of the one or more nodes at the selected static cluster and a second location of a central storage location at the dynamic cluster.

17. A system comprising:
    at least one processor; and
    at least one memory, wherein the at least one processor and the at least one memory are configured to perform a method comprising:
    selecting a static cluster to transition one or more nodes of the selected static cluster to a dynamic cluster; and
    providing to each node of the selected static cluster system at least one install agent within the selected static cluster, the at least one install agent configured to install one or more agents outside of the selected static cluster, the one or more installed agents configured to move the one or more nodes from the selected static cluster to the dynamic cluster.

18. The system of claim 17 further comprising:
    selecting, at a user interface, the static cluster from a list of a plurality of static clusters.

19. The system of claim 17 further comprising:
moving, by the one or more installed agents, the one or more nodes of the selected static cluster to the dynamic cluster.

20. The system of claim 19 further comprising:
initiating, by the one or more installed agents, a shutdown of the selected static cluster, when the one or more agents move the one or more nodes.

* * * * *